US010605925B2

(12) United States Patent
Gong et al.

(10) Patent No.: US 10,605,925 B2
(45) Date of Patent: Mar. 31, 2020

(54) PROCESSING GPS DRIFTING

(71) Applicant: International Business Machines Corporation, Armonk, NY (US)

(72) Inventors: Min Gong, Shanghai (CN); Yun Jie Qiu, Shanghai (CN); Yu Wang, Shanghai (CN); Junchi Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 14/968,994

(22) Filed: Dec. 15, 2015

(65) Prior Publication Data

US 2016/0170028 A1 Jun. 16, 2016

(30) Foreign Application Priority Data

Dec. 15, 2014 (CN) .......................... 2014 1 0778623

(51) Int. Cl.
*G01S 19/23* (2010.01)
*G01S 19/48* (2010.01)
(Continued)

(52) U.S. Cl.
CPC .............. *G01S 19/23* (2013.01); *G01S 19/39* (2013.01); *G01S 19/40* (2013.01); *G01S 19/48* (2013.01)

(58) Field of Classification Search
CPC .......... G01S 19/07; G01S 19/10; G01S 19/11; G01S 19/12; G01S 19/23; G01S 19/25; G01S 19/252; G01S 19/254; G01S 19/256; G01S 19/258; G01S 19/26; G01S 19/37; G01S 19/39; G01S 19/40; G01S 19/41;
(Continued)

(56) References Cited

U.S. PATENT DOCUMENTS

| 5,436,632 A * | 7/1995 | Sheynblat ................. G01S 5/02 342/357.64 |
| 6,373,432 B1 * | 4/2002 | Rabinowitz ............. G01S 19/04 342/3 |

(Continued)

FOREIGN PATENT DOCUMENTS

| CN | 1238868 A | 12/1999 |
| CN | 1415974 A | 5/2003 |

(Continued)

OTHER PUBLICATIONS

"Method and Apparatus to Recover the Untrusted Trajectory Dynamically," IP.com Disclosure No. IPCOM000234133D, Jan. 14, 2014, 4 pages. <http://ip.com/IPCOM/000234133>.

*Primary Examiner* — Bernarr E Gregory
*Assistant Examiner* — Fred H Mull
(74) *Attorney, Agent, or Firm* — Grant M. McNeilly

(57) ABSTRACT

Processing GPS drifting. A method and system for processing GPS drifting is included. The method includes: determining predicted error information on position correction of a device within a region; obtaining a GPS initial position and a corrected position of the device within the region; and determining GPS drifting of the region based on the predicted error information, the GPS initial position, and the corrected position of at least one device within the region. The method and system of the present application can effectively ameliorate GPS drifting issues.

16 Claims, 3 Drawing Sheets

(51) Int. Cl.
*G01S 19/40* (2010.01)
*G01S 19/39* (2010.01)

(58) Field of Classification Search
CPC .......... G01S 19/45; G01S 19/46; G01S 19/48; G01S 19/49
See application file for complete search history.

(56) References Cited

U.S. PATENT DOCUMENTS

| | | | |
|---|---|---|---|
| 8,473,241 | B2 | 6/2013 | Foxlin |
| 8,510,041 | B1 | 8/2013 | Anguelov et al. |
| 2002/0019701 | A1* | 2/2002 | Miller .................. G01C 21/165 701/472 |
| 2002/0169554 | A1* | 11/2002 | Suda ...................... G01S 19/22 701/472 |
| 2005/0024263 | A1* | 2/2005 | Sharpe .................... G01S 19/07 342/357.31 |
| 2005/0110676 | A1 | 5/2005 | Heppe |
| 2010/0085247 | A1* | 4/2010 | Venkatraman .......... G01S 19/05 342/357.64 |
| 2010/0164788 | A1 | 7/2010 | Ghaida |
| 2012/0089319 | A1 | 4/2012 | Basnayake |
| 2015/0338519 | A1* | 11/2015 | Derbez ................... G01S 19/03 342/357.51 |

FOREIGN PATENT DOCUMENTS

| | | |
|---|---|---|
| CN | 101363740 A | 2/2009 |
| CN | 102016624 A | 4/2011 |
| CN | 102778686 A | 11/2012 |
| CN | 102834732 A | 12/2012 |
| CN | 103018758 A | 4/2013 |
| CN | 102183773 B | 5/2013 |
| CN | 103096247 A | 5/2013 |
| CN | 103295414 A | 9/2013 |
| CN | 105759289 A | 7/2016 |
| DE | 102007000390 A1 | 1/2009 |
| DE | 102011103875 A1 | 12/2012 |
| JP | 09230025 A | 9/1997 |
| JP | 2000131088 A | 5/2000 |
| JP | 2002267739 A | 9/2002 |
| JP | 2005055182 A | 3/2005 |
| JP | 2006112822 A | 4/2006 |
| JP | 2006276941 A | 10/2006 |
| JP | 2009041988 A | 2/2009 |
| JP | 2010008418 A | 1/2010 |
| JP | 2010101803 A | 5/2010 |
| JP | 2011033413 A | 2/2011 |
| JP | 2012211843 A | 11/2012 |
| JP | 2013101100 A | 5/2013 |
| JP | 2016114603 A | 6/2016 |
| WO | 2014001947 A1 | 1/2014 |

* cited by examiner

PROCESSING GPS DRIFTING

CROSS-REFERENCE TO RELATED APPLICATION

This application claims the benefit of priority to Chinese Patent Application No. 201410778623.1, filed Dec. 15, 2014, the contents of which are incorporated herein by reference.

BACKGROUND

The present invention relates to GPS positioning, and more particularly the present invention relates to a method and system for processing GPS drifting.

GPS positioning, which is currently widely applied, has a positioning mechanism of determining a position using four satellites, including a 3-dimensional distance and a 1-dimensional time. Specifically, the GPS positioning technique leverages positions of three known points in the space and relative distances to the three points to calculate the position of a GPS receiver. In practical applications, positions of the three known points are provided by a satellite in the sky. The satellite runs accurately under ephemeris. A position of the satellite at a given moment is known. That is, the satellite emits a specific radio signal; the radio signal is received by the GPS receiver after propagation for a certain period. Since the radio propagation velocity is known, the relative distance from the GPS receiver to the satellite can be calculated from a difference between the time when the GPS receiver receives the signal and the time when the satellite emits the signal.

The accuracy of GPS positioning is about +/−10~30 m. However, for a GPS application drifting is a common problem that affects the accuracy of GPS positioning. There are many causes behind GPS drifting, for example, position deviation of the satellite orbit, or ephemeris and clock error, all of which will lead to deviation in positioning accuracy. Furthermore, propagation of radio waves in the air will also be affected by lots of factors. When GPS signals pass through the atmosphere or ionosphere, the signal speed will change somewhat, which also causes GPS drifting.

It is known that various solutions for enhancing GPS accuracy have been proposed. For example, by using a position difference between a known position of a fixed station and a position indicated by a GPS system thereon, a position of a GPS receiver around the station is corrected. However, this solution is too expensive to be applied widely.

The Inertial Navigation System (INS) is also a system capable of providing a higher positioning accuracy. INS positioning is free of the influence of external electromagnetic interference, such that it has a high short-term data accuracy and a good stability. However, since navigation information is generated through integration, the positioning error will also increase with time; therefore, the long-term accuracy is bad. Besides, devices are usually very expensive. Therefore, INS is only equipped in high-end devices.

SUMMARY

In view of the foregoing problems, it is desirable to provide an improved method and system for processing GPS drifting.

According to one aspect of the present invention, there is provided a method for processing GPS drifting. The method includes: determining predicted error information on position correction of a device within a region; obtaining a GPS initial position and a corrected position of the device within the region; and determining GPS drifting of the region based on the predicted error information, the GPS initial position and the corrected position of at least one device within the region.

According to another aspect of the present invention, there is further provided a system for processing GPS drifting. The system includes: predicted error determining module configured to determine predicted error information on position correction of a device within a region; position obtaining module configured to obtain a GPS initial position and a corrected position of the device within the region; and GPS drifting determining module configured to determine GPS drifting of the region based on the predicted error information, the GPS initial position and the corrected position of at least one device within the region.

The method and system according to various aspects of the present invention can effectively ameliorate the GPS drifting issue.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
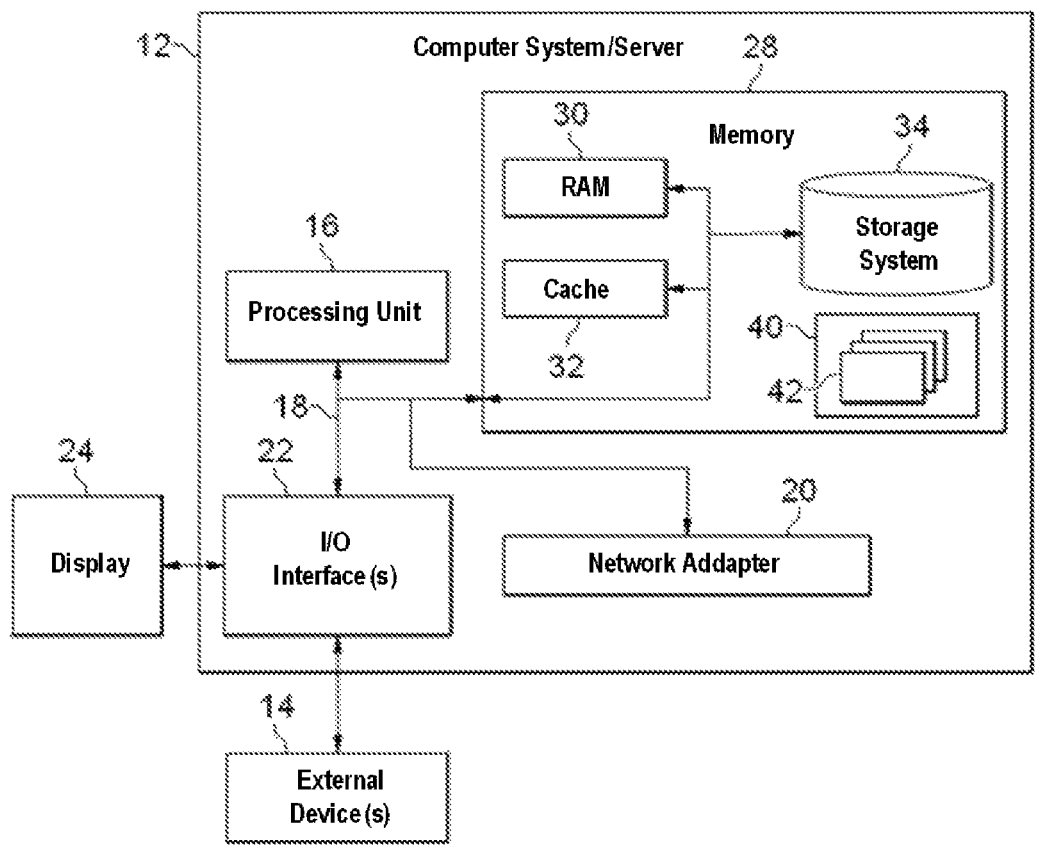
FIG. 1 schematically shows an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein. As shown in FIG. 1, computer system/server 12 is shown in the form of a general-purpose computing device. The components of computer system/server 12 can include, but are not limited to, at least one processor or processing unit 16, system memory 28, and bus 18 that couples various system components including system memory 28 to processor 16.

Bus 18 represents at least one of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24, etc.; at least one device that enable a user to interact with computer system/server 12; and/or any devices (e.g., network card, modem, etc.) that enable computer system/server 12 to communicate with at least one other computing device. Such communication can occur via Input/Output (I/O) interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Inventors of the present invention find that GPS receivers at near positions have the common GPS drift at the same time. This is because that objects in a region connect to the same group of satellites, factors leading to the GPS drift coincide, and in turn the GPS drift caused by these factors is the same. In this region, there are multiple requests from GPS receivers, including vehicles or mobile phones etc.; some of devices might only have basic GPS devices, and some of them might be equipped with higher-accuracy GPS correction devices (e.g. INS). In a connected-vehicle system, vehicle information and status can be collected easily. Therefore, by using GPS receiver correction signals, the GPS drift can be calculated, and therefore other nearby GPS signals corrected.

With reference to the accompanying drawings, description will be presented below to a method and system for processing GPS drifting according to various embodiments of the present invention.

Figure 2:
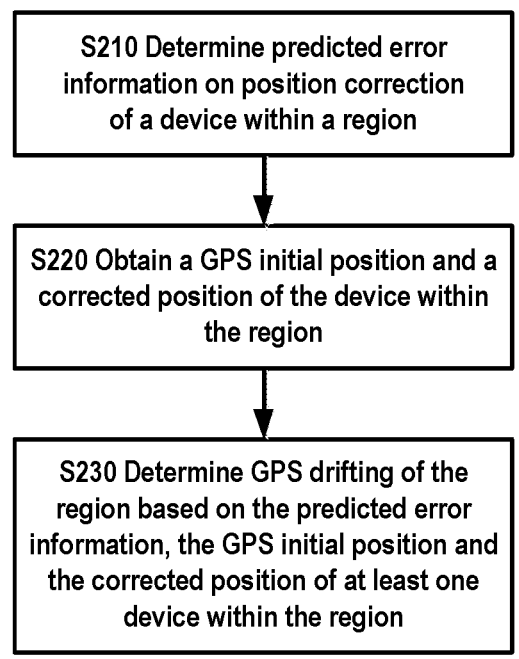
FIG. 2 shows a schematic view of a method for processing GPS drifting according to one embodiment of the present invention.

FIG. 2 shows a method for processing GPS drifting according to one embodiment of the present invention.

In step S210, predicted error information of position correction of a device within a region is determined.

According to one embodiment of the present invention, the determining predicted error information can be implemented based on static or dynamic information of the device.

The static information can include the device's intrinsic performance, such as intrinsic accuracy of a GPS correction manner adopted by the device, whether the device is equipped with INS, or accuracy of a GPS sensor of the device, etc. A device with a high GPS correction accuracy has a small predicted error.

Different positioning devices have different accuracy. Regarding GPS positioning, there can be various types of GPS correction devices, one of which is higher-accuracy positioning device such as INS. INS, also referred to as Inertia Reference System, is a system capable of providing a higher positioning accuracy, which is an autonomous navigation system independent of external information without radiating energy to the outside. The fundamental working principle of inertial navigation is specified below: based on Newtonian mechanics, acceleration of a carrier in the inertial reference system is measured, integrated with time, and then transformed to a navigation coordinate system, thereby obtaining information in the navigation coordinate system, such as velocity, yawning angle, and position. The Inertial Navigation System belongs to a dead reckoning scheme, i.e., reckoning, from the position of a known point, the position of a next point based on consecutively measured course angle and velocity of a moving object, such that a current position of the moving object can be consecutively measured. A gyroscope in the Inertial Navigation System is used for forming a navigation coordinate system, such that the measurement axis of an accelerometer is stabilized in the coordinate system; further, the gyroscope offers orientation and attitude angle. The accelerometer is used for measuring acceleration of the moving object. Velocity can be obtained via integration with time, while distance can be obtained through integrating velocity with time again.

There are further some GPS correction methods, such as a differential GPS, and some corrections implemented via software algorithms. By receiving relevant information of devices, position correction approaches adopted by various devices can be learned, and accordingly predicted error information of their position corrections can be determined.

Dynamic information of the device can include the impact of environmental factors where the device is located. For example, if the device is on a bus, the predicted error would be relatively small because a route of the bus is preset. For another example, if there is only one possible road around a vehicle, then the predicted error would also be relatively small.

The determining predicted error information can be implemented according to some preset conditions. For example, after receiving static or dynamic information from a device, predicted error of position correction of the device can be evaluated according to preset conditions. Or information on its predicted error can be received from the device directly. The predicted error information can be a specific value indicative of the predicted error, or a range of values, or a representation of a level of the predicted error.

In step S220, a GPS initial position and a corrected position of the device within the region are obtained. Here, the GPS initial position is a position received by a GPS receiver of the device. The GPS receiver can be equipped on the device per, or independent of the device. In this case, because the position received by the GPS receiver has to be used as the GPS initial position of the device, the position of the GPS receiver should be close enough to the device.

The corrected position is a position resulting from correcting the GPS initial position of the device. As mentioned above, various known correction approaches can be employed in the device to correct the GPS position received by the GPS receiver, so as to enhance the accuracy of GPS positioning. The corrected position can be a position that has been corrected using INS or other positioning approach, or a position that has been corrected using some software algorithms. For the purpose of simplicity, how to obtain the corrected position will not be detailed here. In step S230, GPS drifting of the region is determined according to the predicted error information, the GPS initial position and the corrected position of at least one device within the region.

According to one embodiment of the present invention, the device used in calculating the GPS drifting can be selected based on the predicted error information of the device within the region; and the GPS drifting of the region can be determined based on the GPS initial position and the corrected position of the selected device.

According to different demands, GPS drifting of a region can be determined using different approaches. For example, GPS drifting of a device with a minimum predicted error within the region can be selected as the GPS drifting of the region, or GPS drifting of a part or all of the devices with relatively small predicted errors within the region can be selected, for calculating GPS drifting of the region.

For example, the predicted error of each device can be compared with a threshold. If the predicted error is greater than the threshold, it indicates that the positioning accuracy of the device is rather bad, such that reference is not made to the device when determining the GPS drifting. If the predicted error is less than or equal to the threshold, then data of the device can be selected for processing.

According to one embodiment of the present invention, when determining GPS drifting of the region, a contribution weight of the device can be determined based on predicted error information of each device, and then according to the contribution weight, weighted correction drifting of respective devices within the region is averaged to determine the GPS drifting of the region, wherein the correction drift represents a position difference between the GPS initial position and the corrected position of each device.

An example of the method for determining GPS drifting is presented below.
First of all, inputs are provided as below:
$L_{ori}$: GPS initial position of each device.
$L_{aug}$: corrected position of each device.
e: predicted error of position correction of each device, which can be determined through joint evaluation based on static information and/or dynamic information according to the device.

The output is provided below:
X: optimal solution of GPS common drifting of the region, which is referred to as GPS drifting for short.

First of all, contribution weights of respective devices to the overall optimal solution are determined based on predicted errors of position correction of respective devices. The principle of determining their weights is that one with a larger error has a smaller weight, while one with a smaller error has a larger weight. A simple method for determining a weight is using the reciprocal of an error, i.e., $$W_j = e_j^{-1} \Big/ \sum_i e_i^{-1}$$

wherein j represents the serial number of each vehicle.

Then, according to weights of respective devices, the weighted correction drifting of various devices is averaged. Correction drifting of respective devices can be represented as $X=L_{aug}-L_{ori}$, wherein the position here can be a point in a 2-dimensional coordinate system, and the drifting distance is a vector. Then, the average of the weighted GPS drift is $X=X_{aug}^T \cdot W$, while the GPS drifting is still a vector, which can be weighted according to each dimension.

According to one embodiment of the present invention, the GPS drifting can also be determined using Kalman filtering. Kalman filtering is an optimal autoregressive data processing algorithm, the essence of which is to reconstruct a system's state vector by measurements. The algorithm recurs following a "predict-measure-correct" order cancels random interference based on the system's measurements, thereby reproducing the system state or restoring the system's true appearance from the contaminated system based on the system's measurements.

In this method the optimal drifting is calculated by Kalman filtering. First of all, a state transition equation and an observation equation of Kalman filtering are listed:

$L(k)=L(k-1)+\Delta$  State transition equation $L_{aug}(k)=L(k)+E$  Observation equation:

wherein k represents a predicted state label of Kalman filtering, L(k) represents the real position of each device in state k, $L_{aug}(k)$ represents the corrected position of each device in state k; here, suppose there is only one corrected position, so the corrected position remains the same for various states. $\Delta$ represents a process error of the state. At the ease of calculation, $\Delta$ can be represented by a Gaussian distribution error having a mean value of 0 and a minor standard deviation (e.g., 1 m); while the standard deviation can be represented by $\delta$, and then $\delta=1$. E represents a corrected position error of the device, which is determined via evaluation based on both of the static information and dynamic information of the device. Generally, E is a Gaussian distribution error having a mean value of 0, whose standard deviation is just e.

Based on the foregoing two equations, steps for calculating the optimal drifting by Kalman filtering are as below:
State variable initialization: state k=0, $\hat{L}(k)=L_{ori}$, $\hat{P}(k)=0$, wherein $\hat{L}(k)$ is the evaluated position in iteration, $\hat{P}(k)$ is an evaluation covariance, and $L_{ori}$ is the GPS initial position of each device.
Iteration: for each state k, $\tilde{L}(k)=\hat{L}(k-1)$ $\tilde{P}(k)=\hat{P}(k-1)+\delta$  Prediction stage $$G(k)=\tilde{P}(k)\cdot[\tilde{P}(k)+e]^{-1}$$

$$\hat{L}(k)=\tilde{L}(k)+G(k)\cdot[L_{aug}-\tilde{L}(k)]$$

$$\hat{P}(k)=\tilde{P}(k)-G(k)\cdot\tilde{P}(k) \quad \text{State updating stage}$$

wherein $\tilde{L}(k)$ is the predicted position in the iteration, $\tilde{P}(k)$ is a prediction covariance in the iteration, and $G(k)$ is the optimal Kalman gain. The iteration process proceeds in a loop; the state k automatically increases by 1 each time, until a difference between evaluation positions in two adjacent states is less than a preset threshold, i.e., $|\hat{L}(k)-\hat{L}(k-1)|<\varepsilon$; finally, the evaluation position will converge on the optimal position, while the optimal drift $X=\hat{L}-L_{ori}$.

According to one embodiment of the present invention, on the basis of the foregoing embodiments, during the process of determining the GPS drifting of the region based on the predicted error information, the GPS initial position, and the corrected position of at least one device within the region, pre-processing filtering can further be added so as to further reduce the impact of interference and enhance the calculation accuracy. Illustration is presented below to a method for pre-processing filtering by way of example.

According to one embodiment of the present invention, an error threshold can be preset by experiment and experience. If the error e of a certain device is greater than the threshold, the device will be excluded from the calculation range, such that only devices whose errors are within the threshold are processed according to the foregoing solution.

According to one embodiment of the present invention, predicted error information of various devices within the range can further be subject to statistical analysis so as to dynamically determine a threshold of the region. The policy of dynamic determination can be at least one of: singling out a certain percentage of minimum error devices; singling out devices whose errors are less than a median and a quartile; singling out devices whose errors have peculiarities (e.g., very small).

The method for processing GPS drifting according to the above various embodiments of the present invention can be implemented on a server or on respective clients. For example, in an Internet of Vehicles environment, for a device equipped on each vehicle, the GPS drifting of a region where the vehicle is located can be determined on a server using the method described in the above embodiment. At this point, the server can provide the determined GPS drifting to various vehicles within the region so that these vehicles can calibrate their GPS positions. Or the GPS drifting of a position of a vehicle can be determined locally at the vehicle by receiving a signal from its surrounding vehicle or other device using the method in the above embodiment. At this point, the vehicle can calibrate its GPS position according to the GPS drifting, or further provide the determined GPS drifting to other surrounding vehicles or devices for calibrating their GPS positions. Furthermore, according to various embodiments of the present invention, the device can be located on a vehicle, a mobile phone or any mobile or fixed apparatus.

Those skilled in the art can understand that the method can be implemented in software, hardware or a combination of software and hardware. Moreover, those skilled in the art can understand by implementing steps in the above method in software, hardware or a combination of software and hardware, there can be provided a system for processing GPS drifting. Even if the system has the same hardware structure as a general-purpose processing device, the functionality of software contained therein makes the system manifest distinguishing properties from the general-purpose processing device, thereby forming an apparatus of the various embodiments of the present invention.

Figure 3:
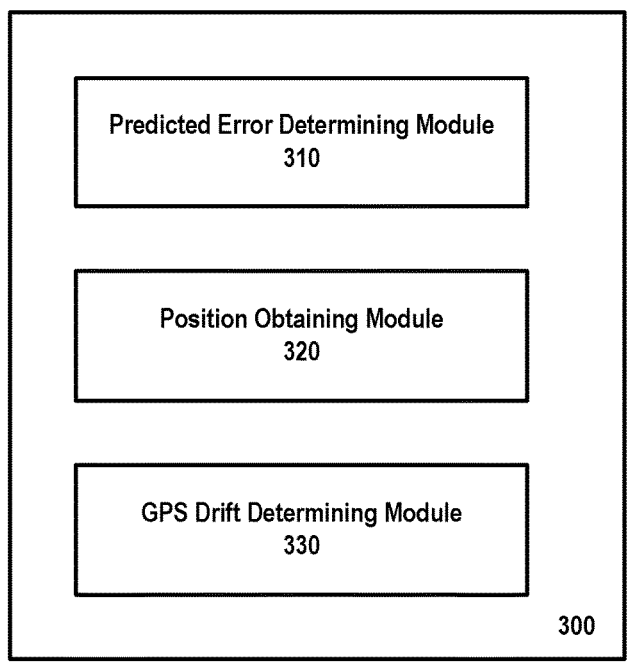
FIG. 3 shows a block diagram of a system for processing GPS drifting according to one embodiment of the present invention.

With reference to FIG. 3, description is presented below to a system for processing GPS drifting according to various embodiments of the present invention. As shown in FIG. 3, a system 300 includes: predicted error determining module 310 configured to determine predicted error information on position correction of a device within a region; position obtaining module 320 configured to obtain a GPS initial position and a corrected position of the device within the region; GPS drifting determining module 330 configured to determine GPS drifting of the region based on the predicted error information, the GPS initial position and the corrected position of at least one device within the region.

According to one embodiment of the present invention, the system can further include: sending module (not shown) configured to provide the GPS drifting to a device within the region so as to calibrate a GPS position of the device. According to one embodiment of the present invention, the system can further include: calibrating module (not shown) configured to calibrate a GPS position of a device within the region based on the GPS drifting. According to one embodiment of the present invention, the predicted error determining module is further configured to evaluate the predicted error information on the position correction of the device according to at least one of: static information of the device and dynamic information of the device.

According to one embodiment of the present invention, the corrected position is a position that has been corrected by an Inertial Navigation System. According to one embodiment of the present invention, the GPS drift determining module is further configured to: select at least one device from devices within the region; determine GPS drifting of the region according to the GPS initial position and the corrected position of the selected device.

According to one embodiment of the present invention, the GPS drift determining module is further configured to: select from devices within the region a device with the predicted error information less than a threshold. According to one embodiment of the present invention, the threshold is dynamically determined by analyzing the predicted error information of devices within the region.

According to one embodiment of the present invention, the GPS drifting determining module is further configured to: determine a contribution weight of the device according to the predicted error information of the device; determine GPS drifting of the region by averaging weighted correction drifting of at least one device within the region based on the contribution weight, wherein the correction drifting represents a position difference between the GPS initial position and the corrected position of the device. According to one embodiment of the present invention, the GPS drifting determining module is further configured to: determine GPS drifting of the region by using a Kalman filtering method.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Java, Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes at least one executable instruction for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a GPS signal measurement drift amount, comprising:
   determining a first predicted error information on position correction of a first device within a region;

determining a second predicted error information on position correction of a second device within the region;

determining a first contribution weight of the first device based on the first predicted error information and the second predicted error information, wherein the first contribution weight is inversely proportional to the first predicted error information;

determining a second contribution weight of the second device based on the first predicted error information and the second predicted error information, wherein the second contribution weight is inversely proportional to the second predicted error information;

determining a first weighted correction drift using the first predicted error information and the first contribution weight;

determining a second weighted correction drift using the second predicted error information and the second contribution weight;

determining the GPS signal measurement drift amount of the region by averaging the first weighted correction drift and the second weighted correction drift;

obtaining a first GPS initial position of the first device within the region; and determining a first corrected position of the first device based on the first GPS initial position and the GPS signal measurement drift amount.

2. The method according to claim 1, further comprising:
providing the GPS signal measurement drift amount to the second device within the region so as to correct the second GPS initial position of the second device to a second corrected position.

3. The method according to claim 1, further comprising:
correcting a third GPS initial position of a third device that is within the region based on the GPS signal measurement drift amount.

4. The method according to claim 1, wherein the determining first predicted error information on position correction of the first device within the region comprises:
evaluating the first predicted error information on the position correction of the first device based on at least one of: static information of the first device and dynamic information of the first device.

5. The method according to claim 4, wherein the static information includes that the first device has an Inertial Navigation System.

6. The method according to claim 1, wherein the determining the first corrected position of the first device based on the first GPS initial position and the GPS signal measurement drift amount comprises:
determining GPS drifting of the region by using a Kalman filtering method.

7. The method according to claim 1, further comprising:
determining a third predicted error information on position correction of a third device within the region;
comparing the first predicted error information, the second predicted error information, and the third predicted error information to a threshold; and
excluding the third device from the determining of the GPS signal measurement drift amount in response to the third predicted error information being higher than the threshold.

8. The method according to claim 7, wherein the threshold is dynamically determined by analyzing the first predicted error information, the second predicted error information, and the third predicted error information.

9. A system for processing GPS signal measurement drift amount, comprising:
a predicted error determining module configured to determine a first predicted error information of a first device within a region and a second predicted error information of a second device within the region;
a position obtaining module configured to obtain a first GPS initial position of the first device within the region; and
a GPS signal measurement drift amount determining module configured to:
determine a first contribution weight of the first device based on the first predicted error information and the second predicted error information, wherein the first contribution weight is inversely proportional to the first predicted error information;
determine a second contribution weight of the second device based on the first predicted error information and the second predicted error information, wherein the second contribution weight is inversely proportional to the second predicted error information;
determine a first weighted correction drift using the first predicted error information and the first contribution weight;
determine a second weighted correction drift using the second predicted error information and the second contribution weight;
determine the GPS signal measurement drift amount of the region by averaging the first weighted correction drift and the second weighted correction drift; and
determine a first corrected position of the first device based on the first GPS initial position and the GPS signal measurement drift amount.

10. The system according to claim 9, further comprising:
a sending module configured to provide the GPS signal measurement drift amount to the second device within the region so as to correct the second GPS initial position of the second device to a second corrected position.

11. The system according to claim 9, further comprising:
a calibrating module configured to correct a third GPS initial position of a third device within the region according to the GPS signal measurement drift amount.

12. The system according to claim 9, wherein the predicted error determining module is further configured to evaluate the first predicted error information on the position correction of the first device based on at least one of: static information of the first device and dynamic information of the first device.

13. The system according to claim 9, wherein the static information includes that the first device has an Inertial Navigation System.

14. The system according to claim 9, wherein the GPS signal measurement drift amount determining module is further configured to:
determine GPS drifting of the region by using a Kalman filtering method.

15. The system according to claim 9, wherein the GPS signal measurement drift amount determining module is further configured to:
determine a third predicted error information on position correction of a third device within the region;
compare the first predicted error information, the second predicted error information, and the third predicted error information to a threshold; and exclude the third device from the determination of the GPS signal measurement drift amount in response to the third predicted error information being higher than the threshold.

16. The system according to claim 15, wherein the threshold is dynamically determined by analyzing the first predicted error information, the second predicted error information, and the third predicted error information.

* * * * *